(12) United States Patent
Prater et al.

(10) Patent No.: US 8,646,319 B2
(45) Date of Patent: Feb. 11, 2014

(54) DYNAMIC POWER CONTROL FOR NANOSCALE SPECTROSCOPY

(75) Inventors: Craig Prater, Santa Barbara, CA (US); Kevin Kjoller, Santa Barbara, CA (US)

(73) Assignee: Anasys Instruments Corp., Santa Barbara, CA (US)

( * ) Notice: Subject to any disclaimer, the term of this patent is extended or adjusted under 35 U.S.C. 154(b) by 690 days.

(21) Appl. No.: 12/660,266

(22) Filed: Feb. 23, 2010

(65) Prior Publication Data
US 2011/0203357 A1    Aug. 25, 2011

(51) Int. Cl.
*G01B 5/28*    (2006.01)
*G01N 21/84*    (2006.01)

(52) U.S. Cl.
USPC .................................. 73/105; 850/33; 850/38

(58) Field of Classification Search
USPC .............................................. 73/105; 116/275
See application file for complete search history.

(56) References Cited

U.S. PATENT DOCUMENTS

2009/0249521 A1* 10/2009 Dazzi et al. ..................... 850/33
2011/0061452 A1*  3/2011 King et al. ..................... 73/105

* cited by examiner

*Primary Examiner* — Hezron E Williams
*Assistant Examiner* — Rodney T Frank
(74) *Attorney, Agent, or Firm* — Mark Rodgers

(57) ABSTRACT

Dynamic IR radiation power control for use in a nanoscale IR spectroscopy system based on an Atomic Force Microscope. During illumination from an IR source, an AFM probe tip interaction with a sample due to local IR sample absorption is monitored. The power of the illumination at the sample is dynamically decreased to minimize sample overheating in locations/wavelengths where absorption is high and increased in locations/wavelengths where absorption is low to maintain signal to noise.

24 Claims, 7 Drawing Sheets

DYNAMIC POWER CONTROL FOR NANOSCALE SPECTROSCOPY

FEDERALLY SPONSORED RESEARCH

This work was supported in part by NIST-ATP 70NANB7H7025. The government retains certain rights.

RELATED APPLICATIONS

Not Applicable

SEQUENCE LISTING

Not Applicable

BACKGROUND OF THE INVENTION

This invention is related to highly localized Infrared (IR) spectra on a sample surface utilizing an Atomic Force Microscope (AFM) and a variable wavelength pulsed IR source, and specifically to dynamic IR power control for maximizing dynamic range while minimizing sample damage.

IR spectroscopy is a useful tool in many analytical fields such as polymer science and biology. Conventional IR spectroscopy and microscopy, however, have resolution on the scale of many microns, limited by optical diffraction. It would be particularly useful to perform IR spectroscopy on a highly localized scale, on the order of biological organelles or smaller, at various points on a sample surface. Such a capability would provide information about the composition of the sample, such as location of different materials or molecular structures. Conventional infrared spectroscopy is a widely used technique to measure the characteristics of material. In many cases the unique signatures of IR spectra can be used to identify unknown material. Conventional IR spectroscopy is performed on bulk samples which gives compositional information but not structural information. Infrared Microscopy allows collection of IR spectra with resolution on the scale of many microns resolution. Near-field scanning optical microscopy (NSOM) has been applied to some degree in infrared spectroscopy and imaging. Recently, a technique has been developed based on use of an AFM in a unique fashion to produce such localized spectra. This work was described in a publication entitled "Local Infrared Microspectroscopy with Sub-wavelength Spatial Resolution with an Atomic Force Microscope Tip Used as a Photo-thermal Sensor" Optics Letters, Vo. 30, No. 18, Sep. 5, 2005. This technique is also described in detail in co-pending applications U.S. Ser. Nos. 11/803,421 and 12/315,859, commonly owned by the assignee of this invention, and whose contents are incorporated by reference. Those skilled in the art will comprehend the details of the technique in the publication and patent applications but the technique will be described briefly herein for clarity. The general technique is also referred to as Photo-Thermal Induced Resonance, or PTIR.

Referring to FIG. 1, the PTIR technique basically uses an Atomic Force Microscope (AFM). A typical AFM cantilever probe 2 is brought in interaction with a region of a sample 1. A beam from pulsed IR radiation source 3 is directed to the sample 1. When a brief, intense radiation pulse illuminates the sample 1, it causes a rapid sample expansion due to thermal shock, stimulating a resonant oscillation 4 of the cantilever probe 2, which is measurable by the AFM's probe deflection detection system. The amplitude of the thermal shock depends on the degree of IR absorption, which will depend on the material characteristics of the sample in the area immediately under the probe tip. The degree of absorption will also depend on the wavelength of the IR radiation. Thus varying the wavelength of the source and repeating the deflection measurement across a range of wavelengths yields an absorption spectrum 5 for a highly localized region of a sample. The measurement may be repeated at a plurality of points on the sample surface, to create an absorption spectra map, enabling characterization and identification of sample material composition at a previously unattainable resolution. Related techniques detect the local temperature change in the sample via a temperature sensing AFM probes, as described by Hammiche and others in the scientific literature.

It has become apparent during applications testing of a commercial nanoscale IR spectroscopy platform there is a challenge between optimizing the signal to noise ratio and the risk of sample damage. The issue is related to the dynamic range of the measurement technique. If the amount of IR energy absorbed is small in some areas of the sample at particular wavelengths, it creates a signal that is below the limit of detection. To increase the signal to noise ratio, the IR laser power can be turned up to increase the amount of absorbed radiation. But if the absorbed IR energy is too high, it causes substantial heating of the sample in other areas and/or wavelengths which can lead to melting, burning and/or chemical changes in the sample. Even at temperatures below a thermal damage threshold, the sample may soften to the point that the pressure of an AFM tip can cause local plastic deformation, altering the topography of the sample. It is desirable to avoid any or all of these potential types of sample damage.

The temperature rise in the sample is a function of both the laser power at a given wavelength and the sample absorption at that wavelength, as illustrated in FIG. 2. A suitable radiation source using an optical parametric oscillator (OPO) laser has power variations of almost 20× over the range of 1000-2000 $cm^{-1}$. In addition to this, sample absorption peaks can vary by orders of magnitude. In recently obtained spectrums, the ratio between the largest and smallest peak heights can be 20×. So even over the range of 1000-2000 $cm^{-1}$ the sample temperature change could vary by 20×20 =400× over peaks of interest. If the laser power is turned up large enough to resolve the smallest peaks, the sample can easily be damaged at the higher peaks. (Note that the x-axes in FIG. 2 are labeled in "wavenumbers ($cm^{-1}$)" a convention used in spectroscopy. The wavelength in microns is given by 10,000/wavenumber. In this application we use the terms wavenumber and wavelength interchangeably, i.e. measuring a property as a function of wavelength provides equivalent information as measuring a property as a function of wavenumber.)

BRIEF SUMMARY OF THE INVENTION

The Invention is a method and an apparatus for producing an absorption spectrum in a localized region of a sample, using an Atomic Force Microscope. A beam of variable wavelength IR radiation, typically pulsed, is directed at the sample, and the AFM probe tip interacts with the sample. The response of the probe due to absorption of the IR radiation is measured and the IR source power is automatically adjusted based on the response. Typically the response of the probe is measured at a plurality of center wavelengths of the IR radiation, and the adjusting step may occur at one or more of these wavelengths. Versions of the method may include the step of automatically adjusting an angle of the beam of radiation as a function of wavelength.

In preferred embodiments, adjusting the power of radiation according to the probe response is done to limit damage to the sample. The adjusting step may be performed if the cantilever amplitude exceeds a threshold value. Alternatively determining a damaging power density threshold may be based on a rapid decrease in contact resonant frequency due to sample softening.

It is preferable to normalize the probe response to the adjusted power density and to use the normalized data to create an absorption spectra. The adjusting step and the normalizing step may enable measurements of normalized cantilever amplitude with a dynamic range of at least 100, and preferably 1000. In various preferred embodiments, the IR source may an OPO and/or the power adjustment may be accomplished with a variable attenuator. The variable attenuation may be, among others, accomplished with a wire grid polarizer, variable pump current control, adjustable iris, or adjusting beam focus. In various versions of the invention the probe may be a cantilever probe and the probe response is cantilever oscillation, or the probe may be a thermal sensor and the probe response is temperature change, or a combination of the two.

Feedback may be employed to maintain a target amplitude of probe response substantially constant and/or under a threshold value. The invention may also include the step of determining power of the beam of radiation using attenuation values of the variable attenuator. The attenuation value of the variable attenuator may be determined by scaling the current attenuation value by the ratio between the measured probe response and a target probe response. Also for the case where spectra are gathered at a plurality of points covering an area of the sample, look-ahead feedback may be employed to adjust the laser power as the probe nears a wavelength previously measured, such as a corresponding point in an adjacent spectral measurement.

BRIEF DESCRIPTION OF THE DRAWINGS

The invention will be better understood by referring to the following figures.

DETAILED DESCRIPTION OF THE INVENTION

Figure 4:
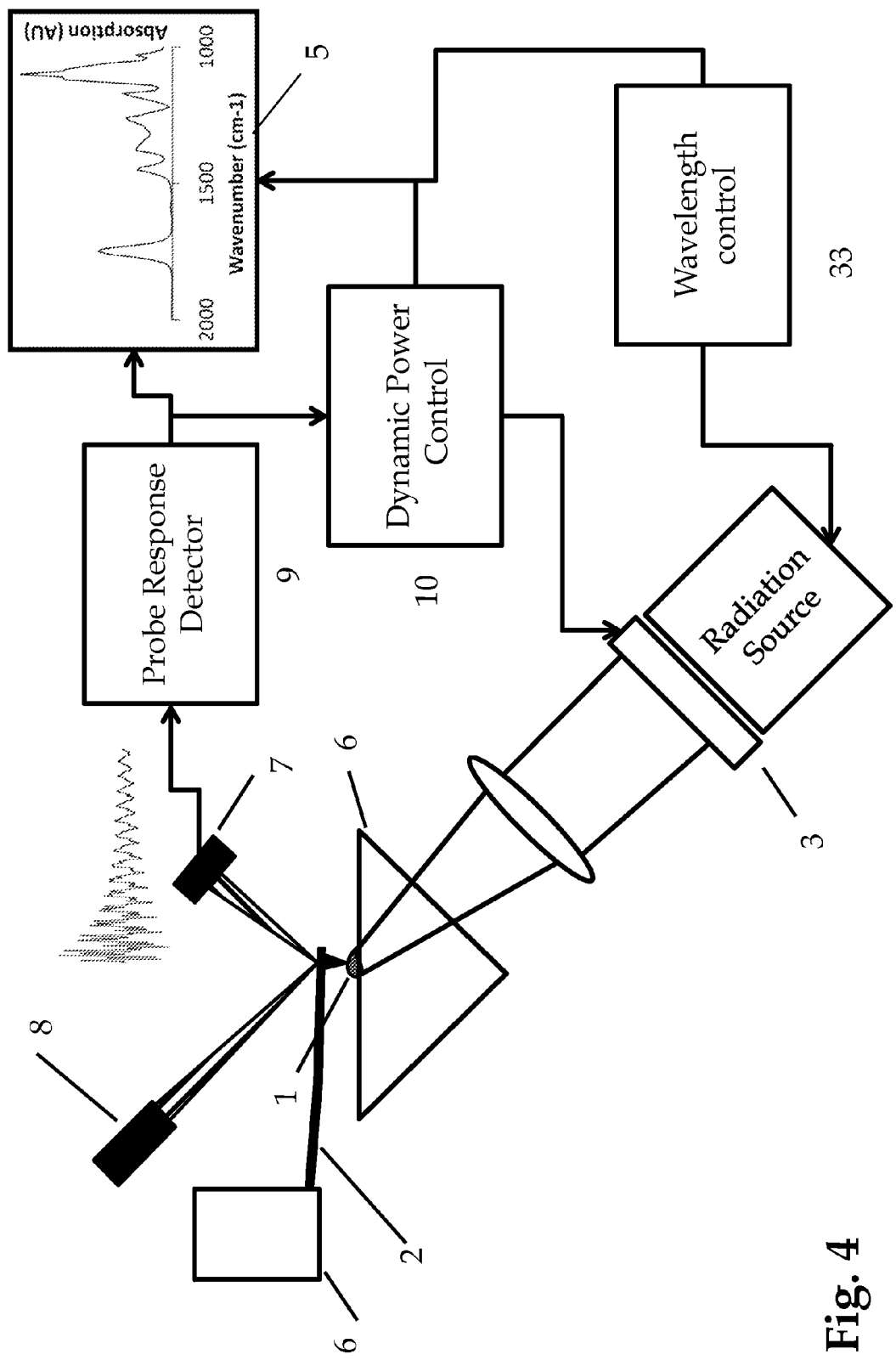
FIG. 4 is a block diagram of a PTIR system adapted to practice the invention

Referring to FIG. 4 the elements required to practice the invention are shown. Sample 1 is probed by an AFM with a cantilever probe 2. In one embodiment an optical lever arm probe motion sensor comprising a source 8 and photodetector 7 interfaced to Probe Response Detector 9 measures motion of the AFM cantilever 2. Many other techniques can be employed to measure the cantilever motion. For example AFMs have be built where the cantilever deflection is performed by electron tunneling, capacitive detection, interferometry, magnetic, piezoelectric, piezoresistive and thermal sensing, for example. Any mechanism that detects the cantilever deflection, motion may be sufficient. Relative motion is generated between the probe and sample by one or more scanning devices. Many different scanning devices can and have been applied in the art. It is understood that the AFM and the details of the scanning and probe detection methods are not part of the novelty of the invention and other AFM arrangements are possible.

To perform nanoscale infrared spectroscopy, a beam from a variable wavelength IR radiation source 3, is directed to a region of the sample. Mirrors, lenses and other optical components may be used to direct and focus the beam from the source onto a region of the sample.

Figure 1:
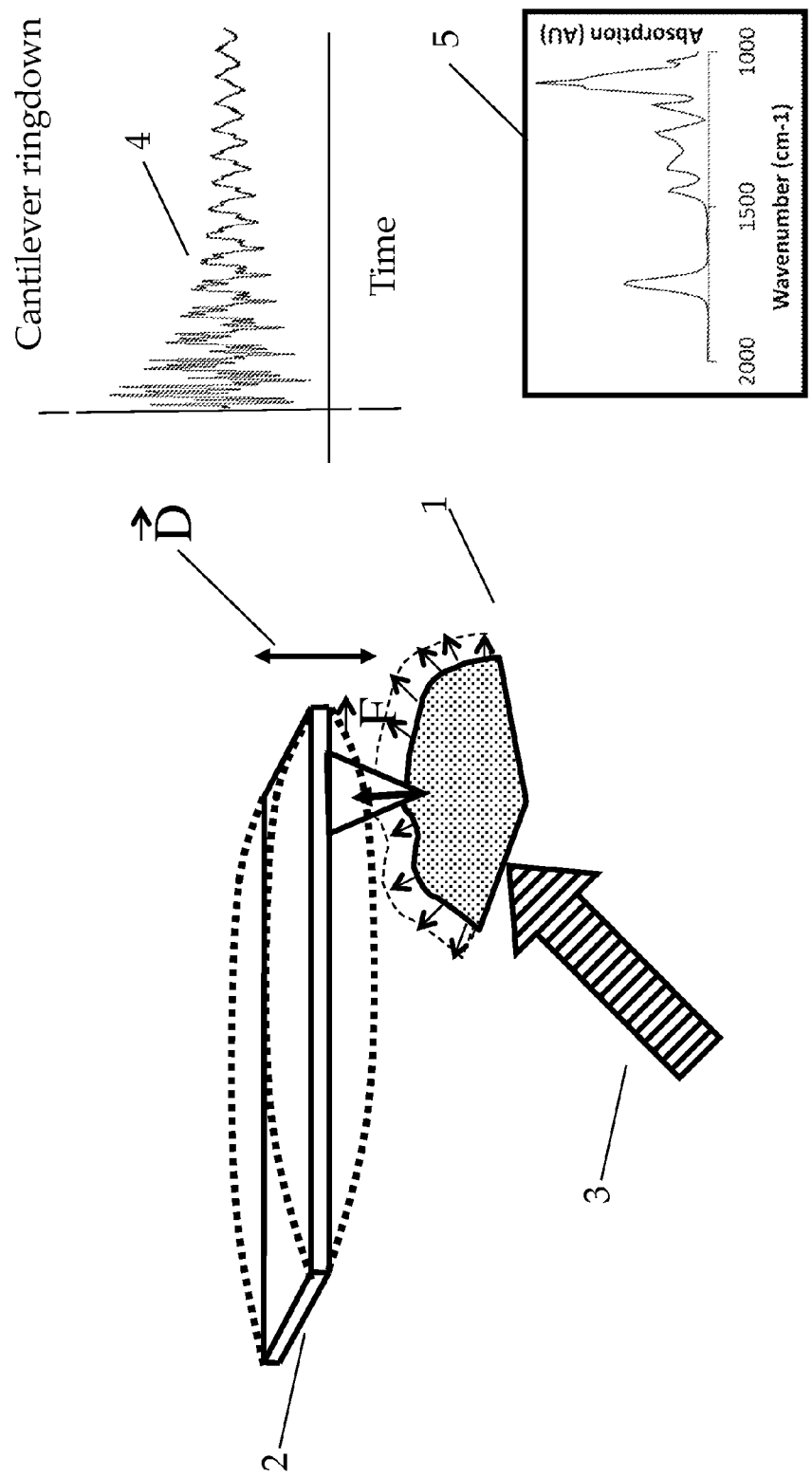
FIG. 1 is a simplified illustration of the PTIR technique
Figure 2:
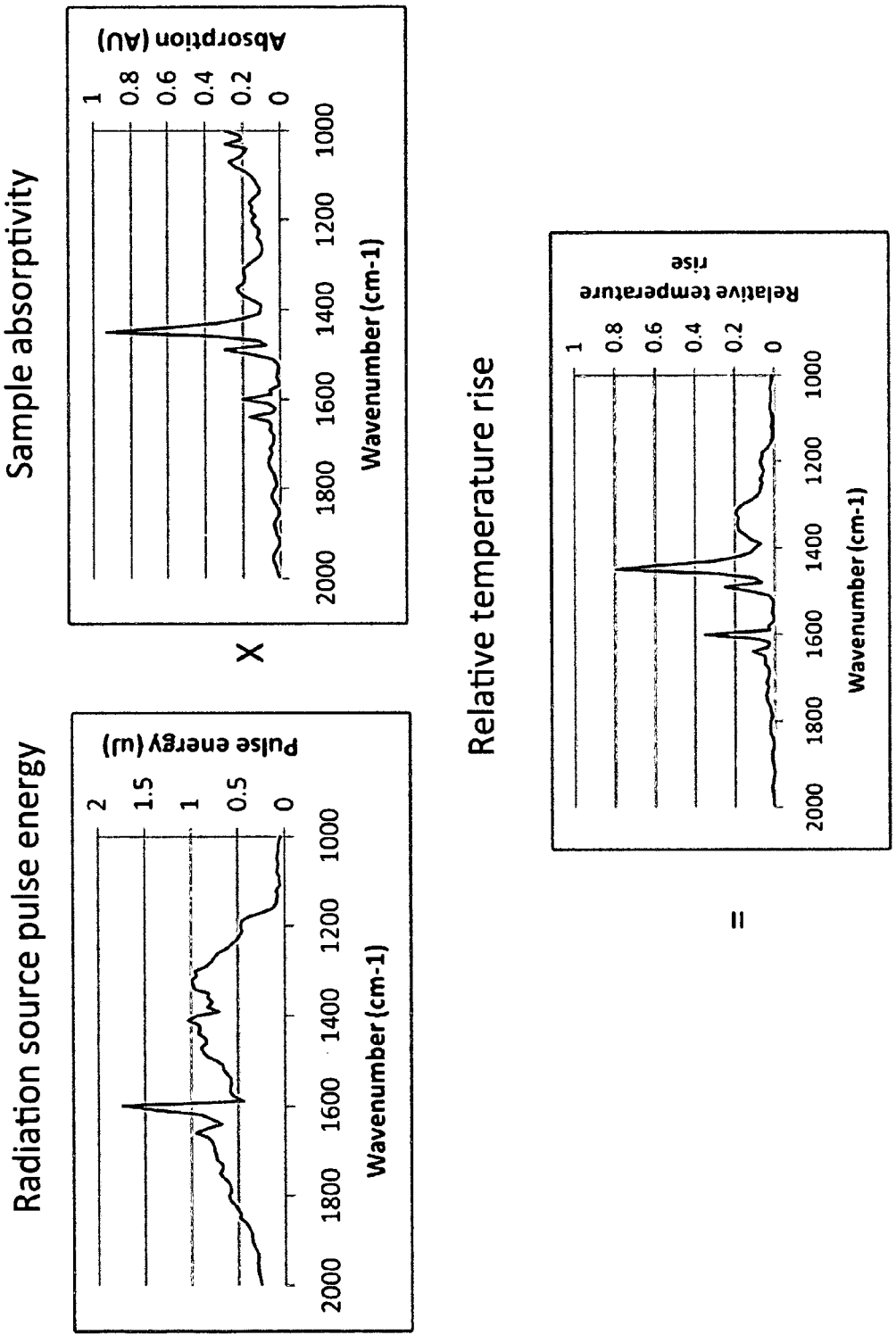
FIG. 2 is an illustration of the source pulse energy, sample absorptivity and temperature rise in a PTIR measurement
Figure 3:
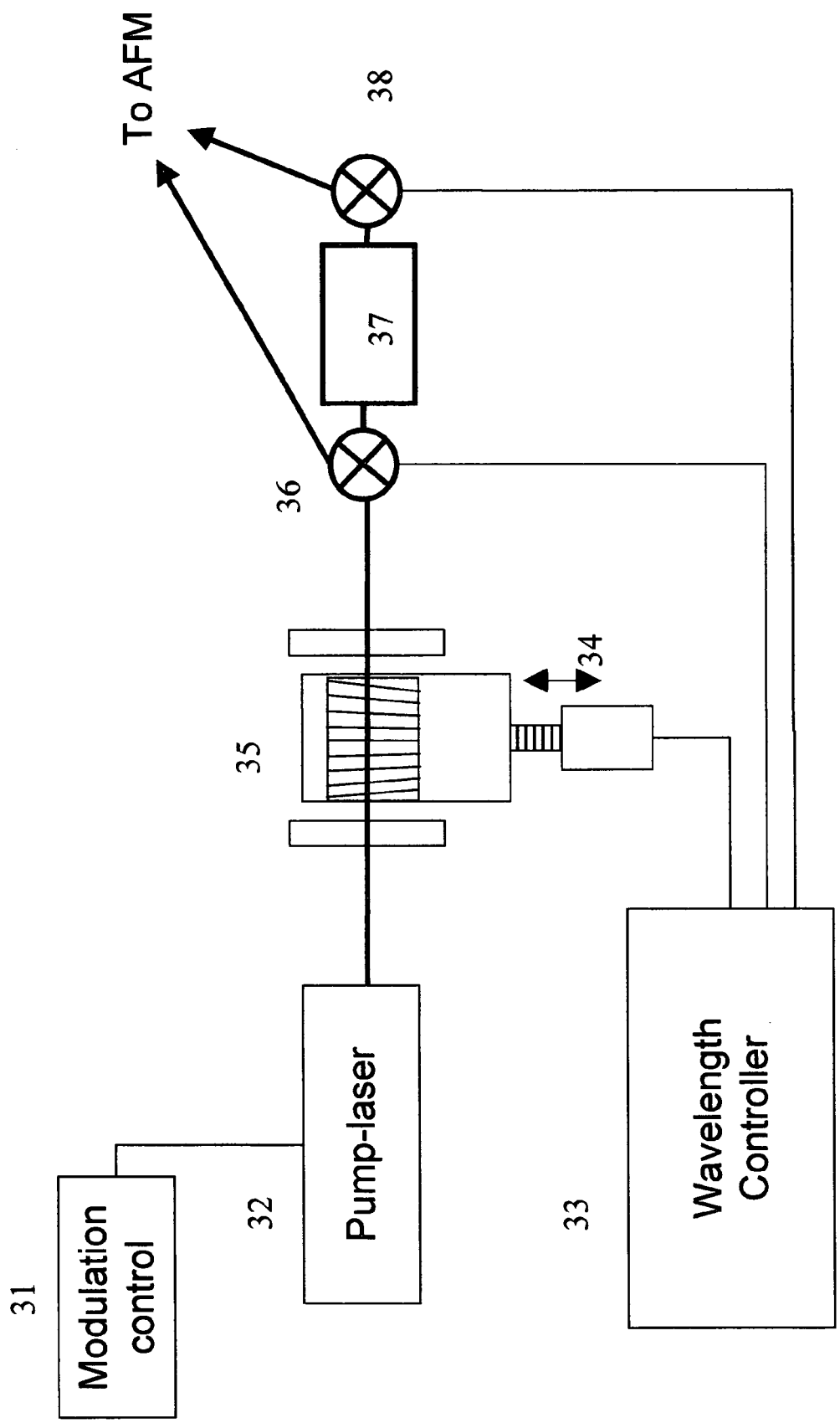
FIG. 3 is a simplified block diagram of an Optical Parametric Oscillator IR source

In one embodiment the source of radiation may be an optical parametric oscillator (OPO) that can be continuously tuned over a wavelength range from 2.5 microns to 10 microns, covering a major fraction of the mid-IR spectral range conventionally used in infrared vibrational spectroscopy. As shown in FIG. 3, a pump laser 32 is modulated 31 to produce suitable pulses these pulses are directed into a periodically poled crystal, for example periodically poled lithium niobate with fan shaped quasi phase matched grating periods 35 as shown. A wavelength controller 33 controls an actuator 34, which moves the fan across the beam. The pump laser beam generates photons at two different wavelengths (signal and idler) depending on the quasi phase match period at a given position, thereby shifting the Pump Laser beam in wavelength. Depending on the desired wavelength range, the beam may be directed directly to the AFM 36, or through a second stage 37 which can contain a second nonlinear optical crystal which generates even longer pulse wavelengths b, and then directed 38 to the AFM. Other sources of radiation may be employed, including visible or IR lasers, quantum cascade lasers, one or more quantum cascade lasers, a broadband source with a monochromator, a $CO_2$ laser, and/or a comb drive source. Any source that can provide an adjustable wavelength and sufficient power density to provide a measurable probe response may be used. Note that while the PTIR technique employs a pulsed radiation source, the problem of sample damage can also exist with CW sources and as such the dynamic power control schemes described herein are also applicable to CW sources.

In some tested versions of the system, the sample is mounted on a zinc selenide prism 6 in FIG. 4 and the illumination is performed by total internal reflection. Alternate approaches involve directing the beam to a region of the sample from above. Any means of directing a beam from the IR source to the sample, including the various means described in the referenced patent applications may be suitable. Wavelength is selected by wavelength control 33. Varying the wavelength of the source and repeating the deflection measurement across a range of wavelengths yields an absorption spectrum 5 for a highly localized region of a sample.

Dynamic power control 10 includes a variable attenuation capability and power control algorithms executing on one or more system controllers. The function of the dynamic power control is to adjust the optical power density delivered to the sample to keep the power density under a level where sample damage occurs. The power density can be controlled for example by changing the power of the beam and/or the focused beam size and/or the repetition rate of the pulsed laser.

In one embodiment the variable attenuator may be a wire grid polarizer, rotated under control of an electronic controller. Wire grid polarizers are available from several sources including Edmund Optics. Neglecting reflections and absorptions of the filter, amount of light transmitted through the polarizer varies like:

$$I = I_o \cos^2 \theta \qquad \text{Eq. 1}$$

where $I_o$ is the incident radiation and $\theta$ is the relative angle between source polarization and polarizer axis. Attenuation values between one and almost zero can be achieved by rotating the polarizer through ninety degrees. A specific attenuation value $I/I_o$ can be selected by choosing a polarizer angle:

$$\theta = \cos^{-1}\left(\sqrt{\frac{I}{I_0}}\right); \quad \text{Eq. 2}$$

(In practice an offset angle parameter is usually required to adjust for mounting uncertainty in the polarizer and/or to select the optimal quadrant of the polarizer rotation.) Wire grid polarizers can be mounted conveniently on a hollow shaft motor, for example available from Nanotec. With a motor with 1.8 degrees per step and using a controller with 256 microsteps/step, 90 degrees of polarizer angle can be divided into 12,800 steps. Other means for variable attenuation in the IR spectrum include, an electronically controllable iris, a variable neutral density filter, direct control of the pump laser power current, or controller directed focusing optics to defocus the beam to reduce power at the sample. Motorized iris diaphragms for example are available from the Newport Corporation. Circular and linear variable neutral density filters are available from the Reynard Corporation. Laser pump current may be controlled by computer interface to a pump laser and/or by analog electronic control. Many motorized focus devices could also be employed to adjust the power density at the sample surface.

The dynamic power controller reads the probe response at a given source wavelength and dynamically adjust the variable attenuator if required. The power can be automatically adjusted prior to a spectral measurement or automatically at each wavelength and positional measurement point, or as often as needed based on the measured probe response. In this case "automatically" means that aside from initial set up of control parameters, the power is adjusted without user intervention.

The probe response is dependent in part upon the IR absorption sample characteristics in the vicinity of the probe tip. Typically the probe sample interaction due to local absorption is in the form of a stimulated resonant oscillation of the cantilever and the measured response parameter is amplitude of the resonant signal.
Alternatively, the probe may include a thermal sensor as known in the art, and the probe interaction may be temperature measurement either in addition to or possibly instead of resonant amplitude.

The dynamic power control capability allows for illumination power to be attenuated in areas of high absorption and/or at wavelengths where the source is more powerful, to reduce potential sample overheating which may distort the measurements. In areas of lower absorption or at wavelengths where less power is available, the attenuation can be reduced.

In a typical PTIR measurement cycle, the probe is placed at a region of the sample, and the source pulse illuminates the sampled at variety of center wavelengths covering some portion of the IR spectrum. The resonant oscillation is measured at each wavelength, from which an absorption spectrum may be generated. Then the probe may be moved to other regions of the sample and the spectrum procedure repeated, thus making an absorption spectrum map of the surface. In one mode, shown in FIG. 5, dynamic power control looks at the resonant probe amplitude at each wavelength and at each position, and adjusts the attenuation up or down depending on whether the amplitude is above a predetermined threshold indicating potential sample damage, or below a predetermined threshold to maintain adequate signal to-noise. Or data from the previous measurement may be used to adjust the current attenuation. Alternatively, the attenuation may be adjusted in feedback with the goal to keep the probe response (e.g. a resonant amplitude) at a set-point value. Note that in practice the probe response is not generally kept at a constant value by the feedback system. The reason is that at many wavelengths there is no significant absorption. In this case, the variable attenuator will open up to maximum power density, but the probe response may still remain below the set-point value. This type of operation is perfectly acceptable and ensures that at any wavelength the signal-to-noise of the measurement is optimized at least up to the maximum available power from the radiation source.

The inventors have employed various strategies for calculating the desired attenuation value. In some cases, traditional PI or PID feedback has been employed. Alternately, simple ratiometric calculations have been applied using a two stage approach. For example the probe response can be averaged over a small number of IR source pulses (for example 8 pulses). This brief measurement can be compared to the target probe response to calculate an attenuator value for the actual data measurement. For example assume that an initial measurement of probe response gave a signal strength of $R_m$, using a starting attenuation value of $A_s$. In this case the next value of the attenuator setting $A_n$ will be given by:

$$A_n = A_s \frac{R_{sp}}{R_m}; \quad \text{Eq. 3}$$

where $R_{sp}$ is the target setpoint value. In practice the values of $A_n$ are limited on the high and low end. At the high end, the attenuation is limited of course to a value of 1 (maximum power transmitted). The maximum attenuator value can also be capped at a lower value for a sensitive sample or near known strong absorption wavelengths. On the low end, the attenuation value can be limited to prevent the attenuation from going too close to zero which would cause additional noise during the normalization procedure described elsewhere. Note that since the IR source can be pulsed at kHz rates, the 8 pulses required to make a measurement for attenuation can have minimal impact on the spectral acquisition time.

For the case where the sample is mapped, data from previously measured points on the map close to the current point, like corresponding positions on adjacent scanlines or corresponding wavelengths from an adjacent point, may be used as look-ahead feedback to anticipate the attenuation values.

Figure 5:
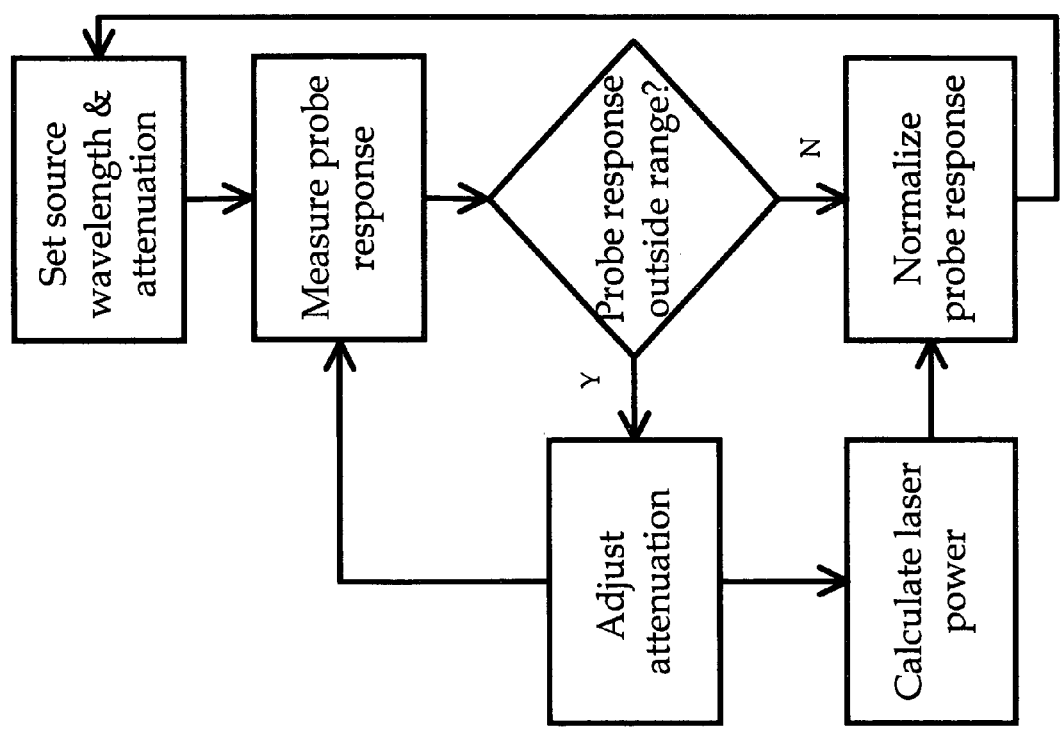
FIG. 5 is a flow chart of the method of the invention

One of the goals of this invention and the instruments described in the copending applications is to create a local IR absorption spectrum of a nanoscale region of a sample and have that spectrum have good correspondence to bulk spectra. This allows existing IR databases to be used to analyze and identify chemical components. To correlate well with IR spectral libraries, it is desirable to normalize the measured probe response by the radiation power density incident on the sample. Under the current invention, the power density incident on the sample is dependent both on the source output power as a function of wavelength and the attenuation value selected by either the user or automatically selected by the dynamic power controller. For example, a normalized absorption spectrum $I_{norm}(\lambda)$ can be created via an equation. An example of a straight forward normalization is:

$$I_{norm}(\lambda) = \frac{I(\lambda)}{P(\lambda)A(\lambda)};$$ Eq. 4

Where $I(\lambda)$ is the measured probe response, $P(\lambda)$ is the raw laser power and $A(\lambda)$ is the attenuation factor applied by the variable attenuator. Note that each of these factors may vary with radiation source wavelength $\lambda$. The radiation source power $P(\lambda)$ may be measured in advance or in real time as the spectra are acquired. In one embodiment, $A(\lambda)$ is the output of the dynamic power controller that is used to set the desired attenuation of the variable attenuator. In this way it is possible to infer the radiation power density incident on the sample (i.e. the two terms in the denominator of the equation above) by (1) measuring $P(\lambda)$ and (2) using the values of $A(\lambda)$ recorded during the spectrum. The values of $P(\lambda)$ may also be corrected for variations in power density associated with wavelength dependent focused spot size. The normalization step is shown in FIG. 5 as well.

Figure 6:
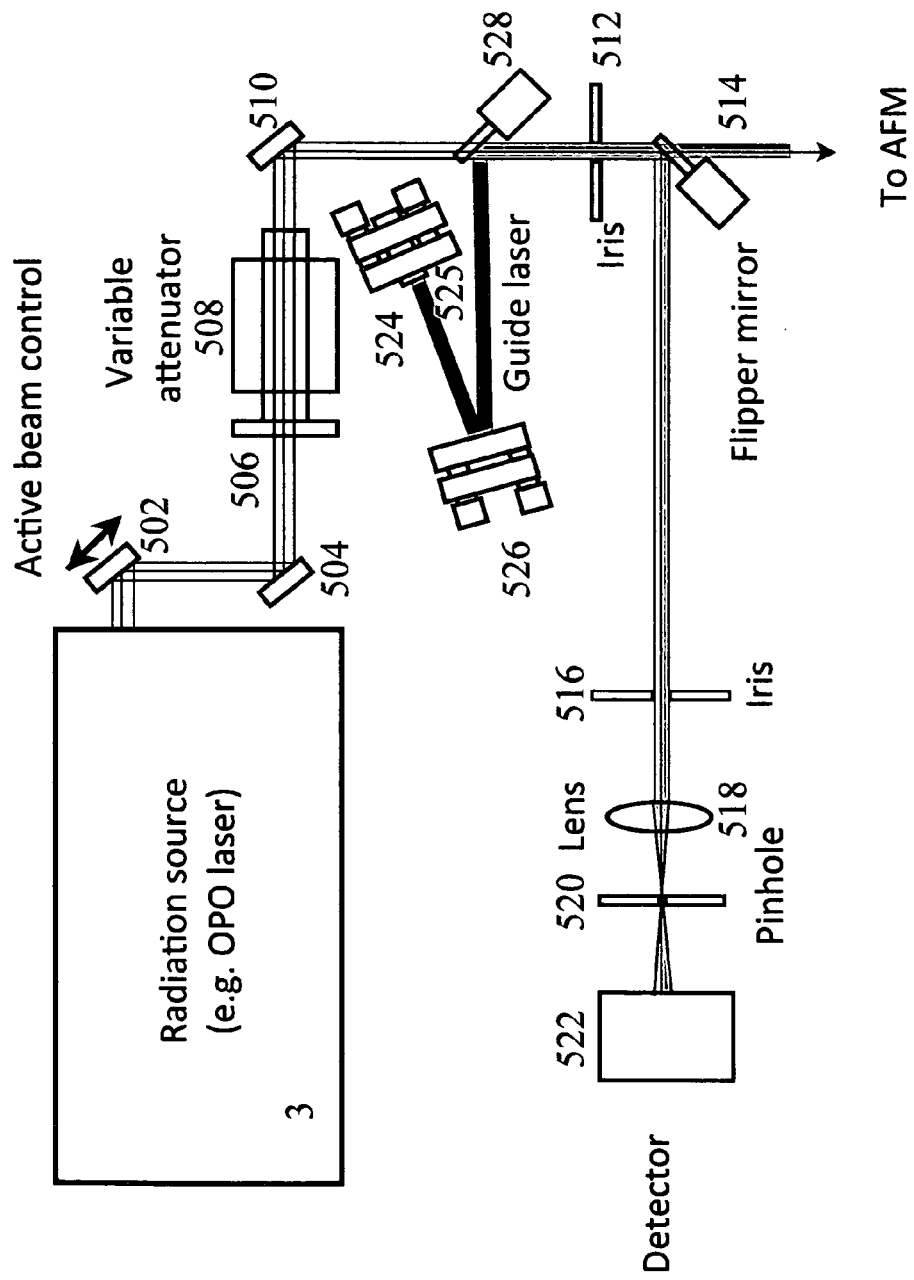
FIG. 6 is a simplified block diagram of instrumentation to provide dynamic beam angle control and radiation source power measurements

Because of the nature of some sources such as the OPO, the beam angle may vary as a function of wavelength, causing variation in the power actually delivered to the sample. Thus measuring total beam power at a power detector may not accurately represent the power at the sample. So in order to perform accurate measurements of $P(\lambda)$ and ensure alignment of the radiation beam with the cantilever probe, the inventors have developed a beam delivery system that integrates a reference path and dynamic beam positioning. As shown in FIG. 6, the beam from radiation source 3 is directed towards one or more electronically controlled mirrors 502 that perform active beam control. This mirror or mirrors can adjust the angle of the beam in one or two axes (one axis is shown for clarity). The electronically controlled mirrors can be adjusted using motorized actuators, piezoactuators or other actuators that tilt the mirror in at least one axis under electronic control. Several companies including Newport sell motorized tip-tilt mirrors. Alternately, mirrors can be adjusted in a single axis by mounting the mirror to the shaft of a stepper motor.

The mirrors are electronically controlled so that they can be adjusted as a function of wavelength to correct for wavelength dependent beam pointing. This can be a significant issue in a broadly tunable laser system due to wavelength dependent refraction in the nonlinear optical crystals, for example. The mirror(s) 502 may also be electronically adjusted to compensate for beam angle shifts with temperature or time.

After leaving the active beam control mirror, the beam is directed via optional fixed mirror 504 to a variable attenuator. In one embodiment the variable attenuator is a wire grid polarizer 506 mounted on a hollow shaft motor 580. The beam is then directed by one or more mirrors 510 towards the AFM. In the case that the radiation source provides an invisible beam (e.g. in the mid-IR), a visible guide laser can be used to mark the path of the IR beam. In this case, a guide laser 525 may be mounted in a tip-tilt stage 524 and the beam may then be directed to a second tip-tilt stage 526. These two tip-tilt stages provide sufficient degrees of adjustment to align the guide laser to be collinear with an IR beam from the radiation source. The collinearity adjustment can be performed by aligning both the guide beam and the IR beam through iris diaphragm's 512 and 520. Two flipper mirrors 514 and 528 can be employed to select the beam path. When flipper mirror 528 is down it blocks the IR beam and reflects the guide laser in its place. If the mirror is moved out of the beam path it allows the IR beam to pass to the AFM. Electronically controlled flipper mirrors are available from Newport and Thorlabs, for example. (Many alternate arrangements of mirrors and/or other electrical and optical components may be used to accomplish the same beam switching tasks).

The second flipper mirror 514 may be used to direct a beam from the radiation source to a detector 522. This detector 522 may be used to measure the power as a function of wavelength for the normalization process described previously. A lens 518 and a pinhole 520 may also be used in front of the detector. If the pinhole 520 is placed at or near the focal point of lens 518 the detector can detect both shifts in radiation power and also shifts in beam angle. The reason is that if the incoming beam angle changes, the focal point will shift and a portion of the beam energy will be blocked by the pinhole. The active beam control mirror(s) 502 can be used to re-center the beam to maximize the power through the pinhole 520 and onto the detector 522. If flipper mirror 514 employs a beam-splitter element then this beam power measurement and active beam control can be performed dynamically during the process of acquiring spectra. It can also be performed as a calibration step and the optimal angles of mirror(s) 502 can be recorded for each wavelength. Using a detector with a lens and pinhole can be extremely useful for normalizing the probe response because this arrangement mimics the optical system used to excite the sample. When a beam from the IR source is focused on a region of the sample it generates a detectable signal when the focused spot of radiation overlaps with the area of probe-sample contact. If the angle of the beam changes due to wavelength or thermally induced shifts, the intensity focused in the region of the tip-sample contact will change as the focus spot centroid changes. The lens/pinhole/detector arrangement allows a reference measurement to be made that can detect and thus correct for changes in beam power intensity and beam angle.

It may be desirable to have some idea what thresholds for sample overheating are, beyond just looking for high response amplitudes. One possibility is to take measurements in one area of a sample, over a wide power range and determining limits before moving to second area for actual data taking measurements. One way to observe sample damage is to observe a rapid decrease in a contact resonant frequency as power is ramped up, due to sample softening when melting or other softening transition occurs. As discussed in the copending application Ser. Nos. 11/803,421 and 12/315,859, when radiation is absorbed by a pulsed radiation source, the cantilever is shocked into oscillation. The frequencies of induced resonant oscillations correspond to vibration modes of the cantilever called contact resonances. The contact resonances are vibration modes that depend on both the mechanical properties of the sample and also the contact stiffness of the sample. If the sample undergoes a softening transition, the contact stiffness can change dramatically. When the contact stiffness drops, the contact resonant frequency also drops. Thus threshold radiation intensities can be determined by ensuring that the maximum beam power stays below a point where there is a significant change in a contact resonant frequency.

Figure 7:
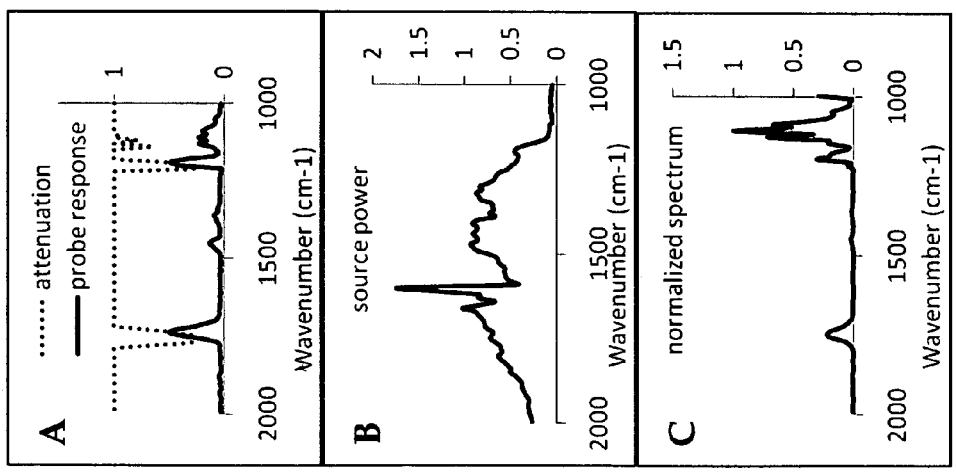
FIG. 7 shows sample spectral measurements employing the current invention with high dynamic range

FIG. 7 shows example measurements performed with one embodiment of the current invention employing dynamic power control and spectrum normalization. FIG. 7A shows the measured probe response under dynamic power control (solid line) and the attenuation value (dotted line) selected by the controller at each wavenumber (or equivalently, each wavelength). Note that the attenuator value dips at strong absorptions. As mentioned previously, this may keep incident radiation power below levels that can damage or alter the sample. FIG. 7B shows a measurement of radiation source power (in this case an OPO) as a function of wavenumber. The spectrum in FIG. 7C is normalized using the laser power curve in 7B along with the attenuation curve in 7A using the formula in equation 4. The dynamic range in this example measurement is around 2300, obtained by comparing the peak amplitude at around 1110 cm$^{-1}$ versus the average baseline noise level between 1800-2000 cm$^{-1}$. By comparison on some materials, the dynamic range without dynamic power control of the current invention can be on the order of ten. For example, the raw probe response in FIG. 7A has a dynamic range of only around 12. Without dynamic power control it would have been necessary to select a laser power such that the sample was not damaged at the highest absorption peak, thus leading to significantly lower signal to noise. For example, the signal to noise ratio in the normalized spectrum in FIG. 7C is around 400.

It will be apparent to the skilled artisan that there are numerous changes that may be made in embodiments described herein without departing from the spirit and scope of the invention. Other features not mentioned in the specification, but known to one skilled in the art may be integrated as well without departing from the spirit and scope of the present invention. There are, for example, a wide array of materials, apparatuses, and methods which may be interchangeably used, and there are many changes that may be made in dimensions and so forth to accommodate different needs which may be used, all within the scope of the invention. The methods, system, and apparatuses of the present invention should therefore be afforded the broadest possible scope under examination. As such, the invention taught herein by specific examples is limited only by the scope of the claims that follow.

We claim:

1. A method for producing an absorption measurement of a region of a sample using a probe microscope, the method comprising:
    directing a beam of radiation at a region of a sample;
    interacting a probe of the probe microscope with the region of the sample;
    measuring a probe response due to absorption of radiation by the region of the sample; and,
    automatically adjusting the power density of the beam of radiation based on the probe response.

2. The method of claim 1 wherein the beam of radiation originates from a pulsed infrared laser source.

3. The method of claim 2 wherein the pulsed infrared laser source comprises an optical parametric oscillator.

4. The method of claim 1 further comprising:
    adjusting the power of radiation according to the probe response to limit damage to the sample.

5. The method of claim 1 wherein the power density of the beam of radiation is adjusted using a variable attenuator.

6. The method of claim 1 further comprising performing a series of the measuring steps and the adjusting steps at a plurality of center wavelengths of the beam of radiation.

7. The method of claim 6 further comprising the step of normalizing the relative probe response by the radiation power as a function of center wavelength to create an absorption spectrum of the region.

8. The method of claim 7 further comprising the step of determining power of the beam of radiation using attenuation values of a variable attenuator.

9. The method of claim 8 wherein the variable attenuator comprises at least one of the following: a wire grid polarizer, variable pump current, adjustable iris, and adjustable focus.

10. The method of claim 1 further comprising:
    maintaining with feedback control a target amplitude of probe response substantially constant.

11. The method of claim 8 wherein the attenuation value of the variable attenuator is determined by scaling the current attenuation value by the ratio between the measured probe response and a target probe response.

12. The method of claim 7 wherein the adjusting step and the normalizing step enable measurements of normalized cantilever amplitude with a dynamic range of at least 100.

13. The method of claim 7 wherein the adjusting step and the normalizing step enable measurements of normalized cantilever amplitude with a dynamic range of at least 1000.

14. The method of claim 1 wherein the adjusting step is performed if the cantilever amplitude exceeds a threshold value.

15. The method of claim 1 further comprising automatically adjusting an angle of the beam of radiation as a function of wavelength.

16. A method for producing an absorption measurement of a region of a sample using a probe microscope, the method comprising:
    directing a beam of radiation from a variable wavelength source at a region of a sample;
    interacting a probe of a probe microscope with the region of the sample;
    measuring a probe response due to absorption of radiation by the region of the sample at a plurality of source wavelengths;
    adjusting the power density of the radiation at one or more wavelengths of the variable wavelength source based on the probe response.

17. The method of claim 16 wherein the adjusting step limits damage to the sample.

18. The method of claim 16 further comprising the step of normalizing the measured probe response by the adjusted radiation power density.

19. The method of claim 16 further comprising determining a damaging power density threshold based on a decrease in contact resonant frequency due to sample softening.

20. An apparatus for measuring an absorption spectrum from a region of a sample using a probe microscope, comprising:
    a) a variable wavelength source of radiation, wherein radiation from the source is directed at a region of the sample;
    b) a probe response detector that measures an probe response induced by absorption of radiation by the sample;
    c) A control system that automatically adjusts the power density directed from the variable wavelength source to the sample based on the detected probe response.

21. The apparatus of claim 20 wherein the probe is a cantilever probe and the response is cantilever oscillation amplitude.

22. The apparatus of claim 20 wherein the probe is a thermal sensor and probe response is temperature change.

23. A method for producing an absorption measurement of a region of a sample using a probe microscope, the method comprising:
    directing a beam of radiation from a variable wavelength source at a region of a sample;
    interacting a probe of a probe microscope with the region of the sample;
    measuring a probe response due to absorption of radiation by the region of the sample at a plurality of source wavelengths;
    calculating a normalized absorption spectrum using the probe response wherein the dynamic range of the absorption spectrum is greater than 100.

24. The method of claim 23 wherein the dynamic range is greater than 1000.

* * * * *